United States Patent
Mukkavilli et al.

(10) Patent No.: US 10,644,910 B2
(45) Date of Patent: May 5, 2020

(54) METHODS AND APPARATUS FOR MANAGING INTERFERENCE ACROSS OPERATORS

(71) Applicant: QUALCOMM Incorporated, San Diego, CA (US)

(72) Inventors: Krishna Kiran Mukkavilli, San Diego, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/941,754

(22) Filed: Mar. 30, 2018

(65) Prior Publication Data
US 2018/0227151 A1    Aug. 9, 2018

Related U.S. Application Data

(63) Continuation of application No. 15/479,211, filed on Apr. 4, 2017, now Pat. No. 9,985,808.
(Continued)

(51) Int. Cl.
*H04L 25/08* (2006.01)
*H04W 16/14* (2009.01)
(Continued)

(52) U.S. Cl.
CPC ............ *H04L 25/08* (2013.01); *H04L 5/14* (2013.01); *H04L 69/22* (2013.01); *H04W 16/14* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 6,643,321 B1 * | 11/2003 | Genossar | H04L 25/03038 375/219 |
| 2009/0252069 A1 * | 10/2009 | Ahn | H04L 5/0007 370/295 |

(Continued)

FOREIGN PATENT DOCUMENTS

EP    2229020 A1    9/2010

OTHER PUBLICATIONS

CATT, "Utilization of Guard Band for Data Transmission", 3GPP TSG RAN Meeting#62, RP-131766, Busan, Korea, Dec. 3-6, 2013, 1 page.
(Continued)

*Primary Examiner* — Wednel Cadeau
(74) *Attorney, Agent, or Firm* — Patterson & Sheridan, L.L.P

(57) ABSTRACT

Aspects of the present disclosure provide an apparatus and techniques for managing interference across carriers of an operator. A base station identifies a first portion of a first carrier assigned to an operator, wherein uplink and downlink subframe configuration for TDD communications using the first portion and a first portion of a second carrier also assigned to the first operator are synchronized between the first and the second carriers. The base station identifies a second portion of the first carrier, wherein uplink and downlink subframe configurations for TDD communications using the second portion and a second portion of the second carrier are not synchronized between the first and second carriers. The base station communicates with one or more user equipments (UEs) using the first and second portions of the first carrier.

18 Claims, 11 Drawing Sheets

Related U.S. Application Data

(60) Provisional application No. 62/359,609, filed on Jul. 7, 2016.

(51) Int. Cl.
    *H04L 5/14*       (2006.01)
    *H04L 29/06*     (2006.01)
    *H04W 72/04*    (2009.01)
    *H04W 16/32*    (2009.01)

(52) U.S. Cl.
    CPC .......... *H04L 5/1469* (2013.01); *H04W 16/32* (2013.01); *H04W 72/0446* (2013.01)

(56) References Cited

U.S. PATENT DOCUMENTS

| | | |
|---|---|---|
| 2013/0336178 A1 | 12/2013 | Tiirola et al. |
| 2015/0249531 A1* | 9/2015 | Lindoff .............. H04L 1/1812 370/280 |
| 2015/0281974 A1* | 10/2015 | Ghasemzadeh ....... H04W 16/14 455/454 |
| 2017/0164375 A1 | 6/2017 | Sundararajan et al. |
| 2017/0170936 A1 | 6/2017 | Sundararajan et al. |
| 2018/0013594 A1 | 1/2018 | Mukkavilli et al. |

OTHER PUBLICATIONS

International Search Report and Written Opinion—PCT/US2017/033610—ISA/EPO—dated Sep. 18, 2017.

LG Electronics: "Further Study on the Deployment Scenarios for Dynamic TDD UL-DL Reconfigurations," 3GPP Draft; R1-131291 Further Study on EIMTA Scenarios LG, 3rd Generation Partnership Project (3GPP), Mobile Competence Centre; 650, Route Des Lucioles; F-06921 Sophia-Antipolis Cedex; France, vol. RAN WG1, No. Chicago, USA; Apr. 15, 2013-Apr. 19, 2013, Apr. 6, 2013, XP050697168, Retrieved from the Internet: URL: http://www.3gpp.org/ftp/tsg_ran/WG1_RL1/TSGR1_72b/Docs/ [retrieved on Apr. 6, 2013].

* cited by examiner

METHODS AND APPARATUS FOR MANAGING INTERFERENCE ACROSS OPERATORS

This application is a continuation of U.S. application Ser. No. 15/479,211 entitled "METHODS AND APPARATUS FOR MANAGING INTERFERENCE ACROSS OPERATORS", filed on Apr. 4, 2017, which claims priority to U.S. Provisional Application Ser. No. 62/359,609, entitled "METHODS AND APPARATUS FOR MANAGING INTERFERENCE ACROSS OPERATORS", filed on Jul. 7, 2016, each of which is expressly incorporated by reference herein in its entirety.

BACKGROUND

Field of the Disclosure

The present disclosure generally relates to wireless communication and, more particularly, to methods and apparatus for managing interference across operators.

Description of Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure provide a method of wireless communication performed by a base station. The method generally includes identifying a first portion of a first carrier assigned to an operator, wherein uplink and downlink subframe configuration for TDD communications using the first portion and a first portion of a second carrier also assigned to the first operator are synchronized between the first and the second carriers; identifying a second portion of the first carrier, wherein uplink and downlink subframe configurations for TDD communications using the second portion and a second portion of the second carrier are not synchronized between the first and second carriers; and communicating with one or more user equipments (UEs) using the first and second portions of the first carrier.

Certain aspects of the present disclosure provide an apparatus for wireless communication by a base station. The apparatus generally includes means for identifying a first portion of a first carrier assigned to an operator, wherein uplink and downlink subframe configuration for TDD communications using the first portion and a first portion of a second carrier also assigned to the first operator are synchronized between the first and the second carriers; means for identifying a second portion of the first carrier, wherein uplink and downlink subframe configurations for TDD communications using the second portion and a second portion of the second carrier are not synchronized between the first and second carriers; and means for communicating with one or more user equipments (UEs) using the first and second portions of the first carrier.

Certain aspects of the present disclosure provide an apparatus for wireless communication by a base station. The apparatus generally includes at least one processor and a memory coupled to the at least one processor. The at least one processor is configured to identify a first portion of a first carrier assigned to an operator, wherein uplink and downlink subframe configuration for TDD communications using the first portion and a first portion of a second carrier also assigned to the first operator are synchronized between the first and the second carriers; identify a second portion of the first carrier, wherein uplink and downlink subframe configurations for TDD communications using the second portion and a second portion of the second carrier are not synchronized between the first and second carriers; and communicate with one or more user equipments (UEs) using the first and second portions of the first carrier.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical assets of this disclosure and are therefore not to be considered limiting of its scope, for the description may admit to other equally effective aspects.

DETAILED DESCRIPTION

Figure 1:
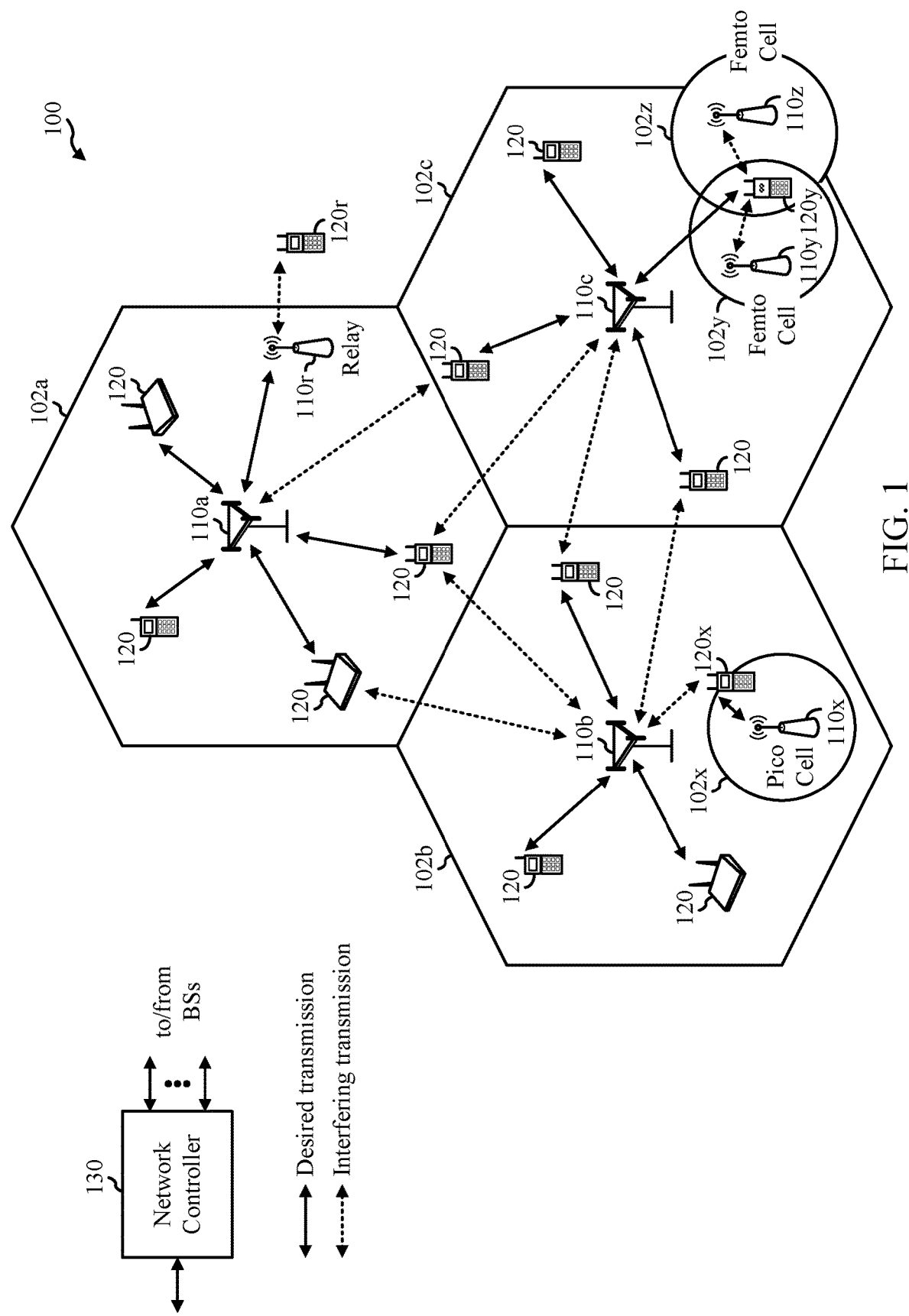
FIG. 1 is a block diagram conceptually illustrating an example telecommunications system, in accordance with certain aspects of the present disclosure.

As the demand for mobile broadband access continues to increase, and with more UEs accessing the long-range wireless communication networks and more short-range wireless systems being deployed in communities, the possibilities of interference and congested networks grows. For example, traditional time division duplexing (TDD) implementations have utilized fixed configurations of downlink and uplink subframes, wherein the downlink and uplink scheduling is synchronized over the entire deployment. In such a fixed configuration, the entire system follows a particular timing pattern for base station downlink and uplink communications. Such synchronized downlink and uplink scheduling deployments have been generally acceptable due to their relatively simple deployment and management. In particular, the use of downlink and uplink synchronized scheduling limits the interference scenarios to downlink-to-downlink and uplink-to-uplink interference scenarios. Accordingly, downlink-to-uplink or uplink-to-downlink interference scenarios (collectively and separately referred to herein as mixed interference scenarios) are avoided and interference mitigation for such mixed interference scenarios need not be provided for.

One goal of $5^{th}$ Generation (5G) or New Radio (NR) standards is to provide for dynamic scheduling of UL or DL transmissions for one or more subframes in a network depending on current traffic needs of the network. This dynamic configuration of subframes is often referred to as Dynamic TDD configuration or simply Dynamic TDD. Dynamic TDD has been made possible within a particular operator's assigned bandwidth region by coordination among network elements of the particular operator. For example, mixed interference profiles may be exchanged between network elements of the operator. One or more network elements (e.g., base stations) of the operator may dynamically select a transmission direction (e.g., UL or DL) to be used in a particular transmission interval based on the traffic needs of the network element and/or based on the mixed interference profiles received from other neighboring network elements.

However, operators generally are not willing to share data across operators' networks, and thus, coordination between network elements of different operators for the purposes of mixed interference mitigation is not generally practical. One solution to enable adjacent operators (e.g., assigned adjacent bandwidth regions of a spectrum) to employ asynchronous TDD operation (e.g., dynamic TDD not synchronous with adjacent operator's network) is to have a large guard band separating the bandwidth regions of the two adjacent operators so that transmissions within bandwidth regions of the two operators do not interfere with each other. However, a large guardband leads to wastage of spectrum, which is a valuable resource. Thus, there is a need for techniques that may enable different operators to employ asynchronous TDD operation (e.g., dynamic TDD) with minimal mixed interference between network elements of the operators and without wasting too much spectrum allocated for guard bands.

In certain aspects of the present disclosure, a technique to accomplish the above goal may include dividing bandwidth regions assigned to networks of each of one or more operators (e.g., operators having adjacent assigned bandwidth regions of a spectrum) into regions of asynchronous TDD operation (e.g., dynamic TDD configuration) and synchronous TDD operation (e.g., static UL/DL configuration), with synchronous regions of the networks assigned at edges of the bandwidth regions closer to each other. The synchronous regions act as a buffer between the asynchronous regions, thus helping to mitigate interference between the asynchronous regions. In addition, as a result of this buffer provided by the synchronous regions, the guard band between the bandwidth regions of the operators may be reduced or completely eliminated as discussed in aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using hardware, software/firmware, or combinations thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software/firmware, middleware, microcode, hardware description language, or otherwise.

Accordingly, in one or more exemplary embodiments, the functions described may be implemented in hardware, software/firmware, or combinations thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Aspects of the present disclosure may be used for new radio (NR) (new radio access technology or 5G technology). NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra reliable low latency communications (URLLC). These services may include latency and reliability requirements. These services may also have different transmission time intervals (TTI) to meet respective quality of service (QoS) requirements. In addition, these services may co-exist in the same subframe.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

FIG. 1 illustrates an example wireless network 100 in which aspects of the present disclosure may be implemented. For example, the wireless network may be a new radio (NR) or 5G network. A BS, for example a BS 110, may be configured to perform operations 900 in FIG. 9 and methods described herein for implementing dynamic TDD across operators. For example, the BS identifies a first region of a first frequency spectrum assigned to a first operator and a first region of a second frequency spectrum assigned to a second operator. In one aspect, the uplink and downlink subframe configurations for Time Division Duplex (TDD) communications using the first region of the first frequency spectrum and the first region of the second frequency spectrum are synchronized between the first and second operator. The BS communicates with one or more user equipments (UEs) using the first and second regions of the first frequency spectrum.

The BS also identifies a second region of the first frequency spectrum assigned to the first operator and a second region of the second frequency spectrum assigned to the second operator. The uplink and downlink subframe configurations for TDD communications using the second region of the first frequency spectrum and the second region of the second frequency spectrum are not synchronized between the first and second operator.

BS 110 may comprise a transmission gNB, reception point (TRP), Node B (NB), 5G NB, access point (AP), new radio (NR) BS, Master BS, primary BS, etc.). The NR network 100 may include the central unit.

As illustrated in FIG. 1, the wireless network 100 may include a number of BSs 110 and other network entities (or network elements). According to an example, the network entities including the BS and UEs may communicate on high frequencies (e.g., >6 GHz) using beams. One or more BS may also communicate at a lower frequency (e.g., <6 GHz). The one or more BS configured to operate in a high frequency spectrum and the one or more BS configured to operate in a lower frequency spectrum may be co-located.

A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and gNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR.

NR may utilize OFDM with a CP on the uplink and downlink and include support for half-duplex operation using TDD. A single component carrier bandwidth of 100 MHz may be supported. NR resource blocks may span 12 sub-carriers with a sub-carrier bandwidth of 75 kHz over a 0.1 ms duration. In one aspect, each radio frame may consist of 50 subframes with a length of 10 ms. Consequently, each subframe may have a length of 0.2 ms. In another aspect, each radio frame may consist of 10 subframes with a length of 10 ms, where each subframe may have a length of 1 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases, DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
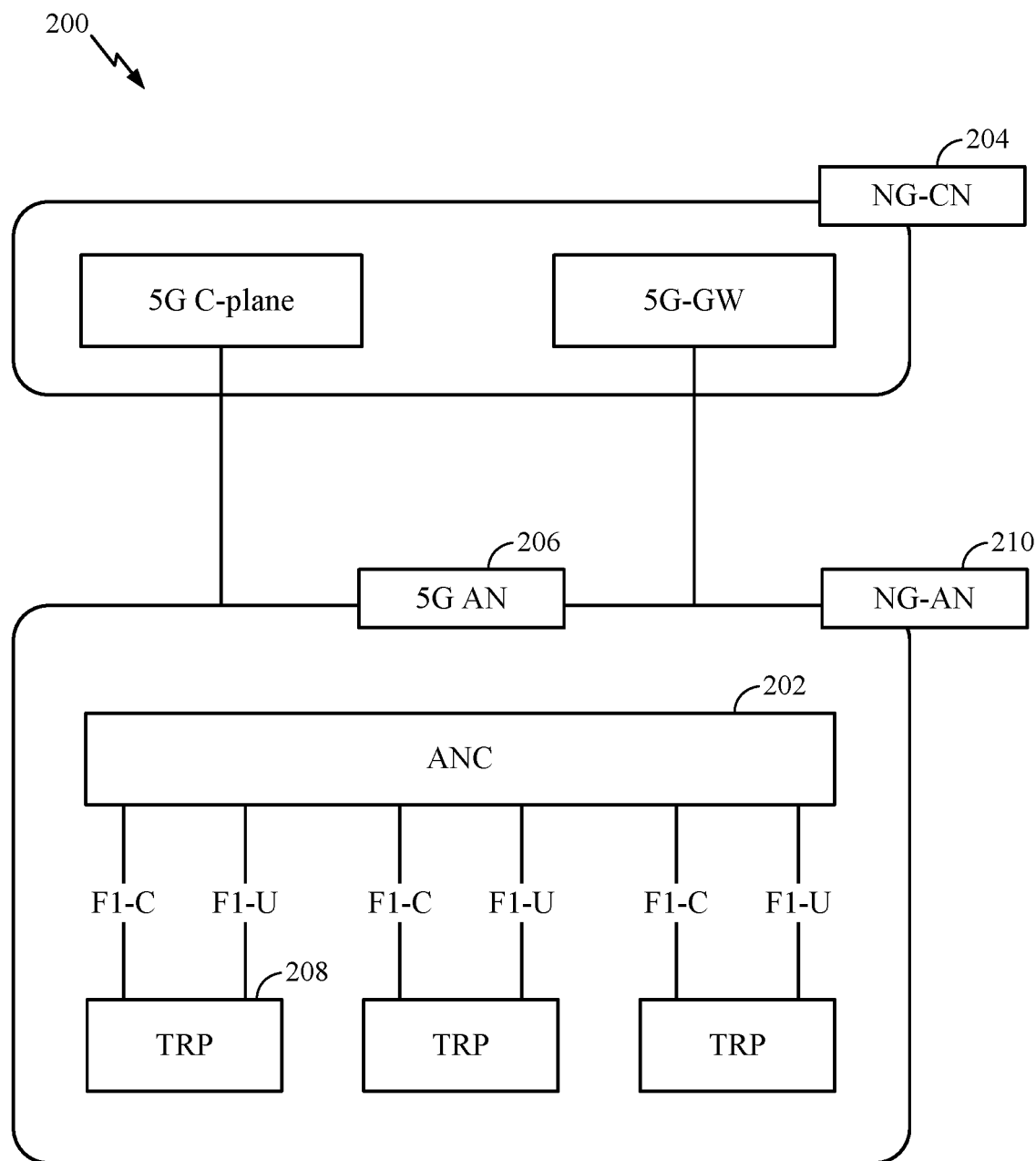
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
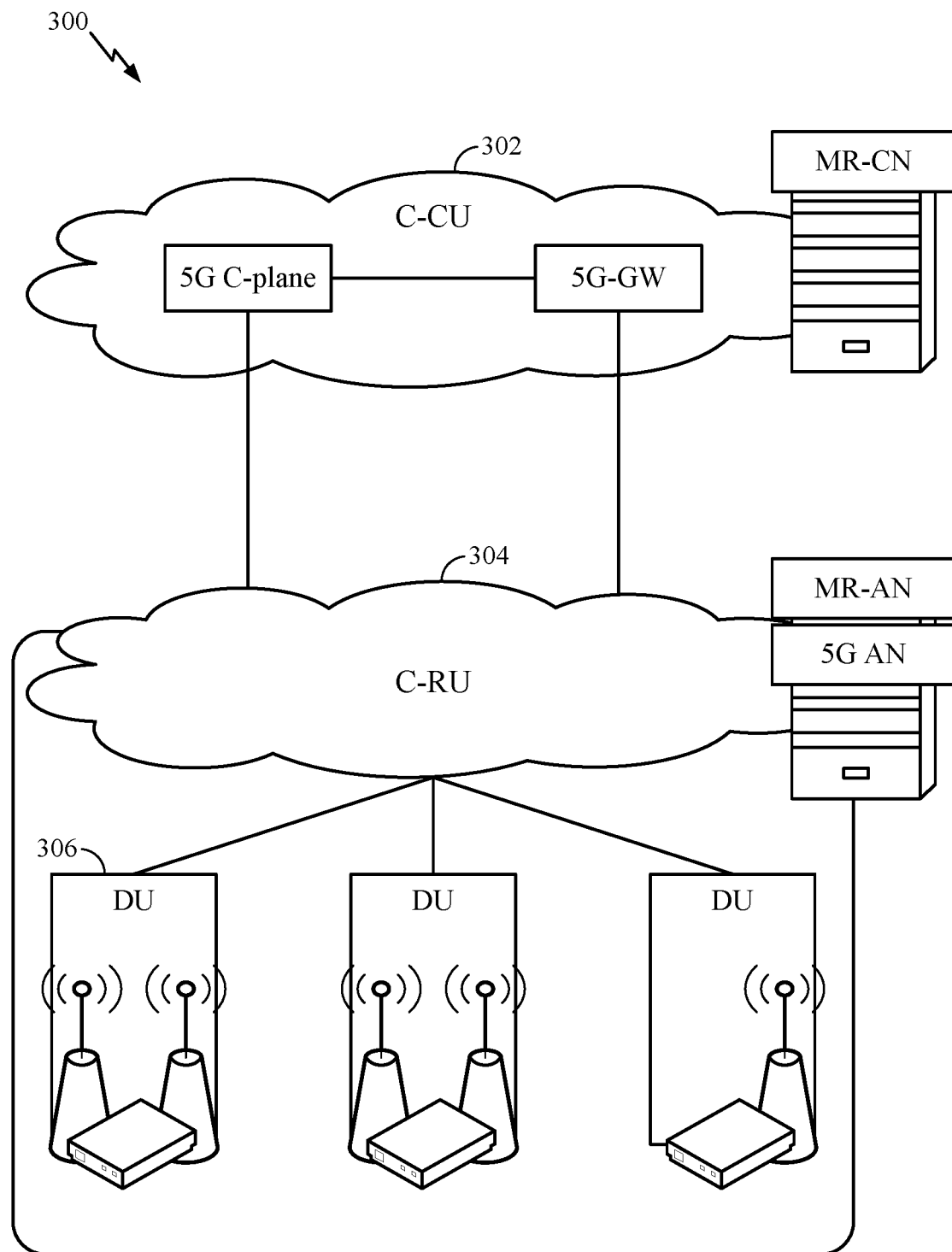
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
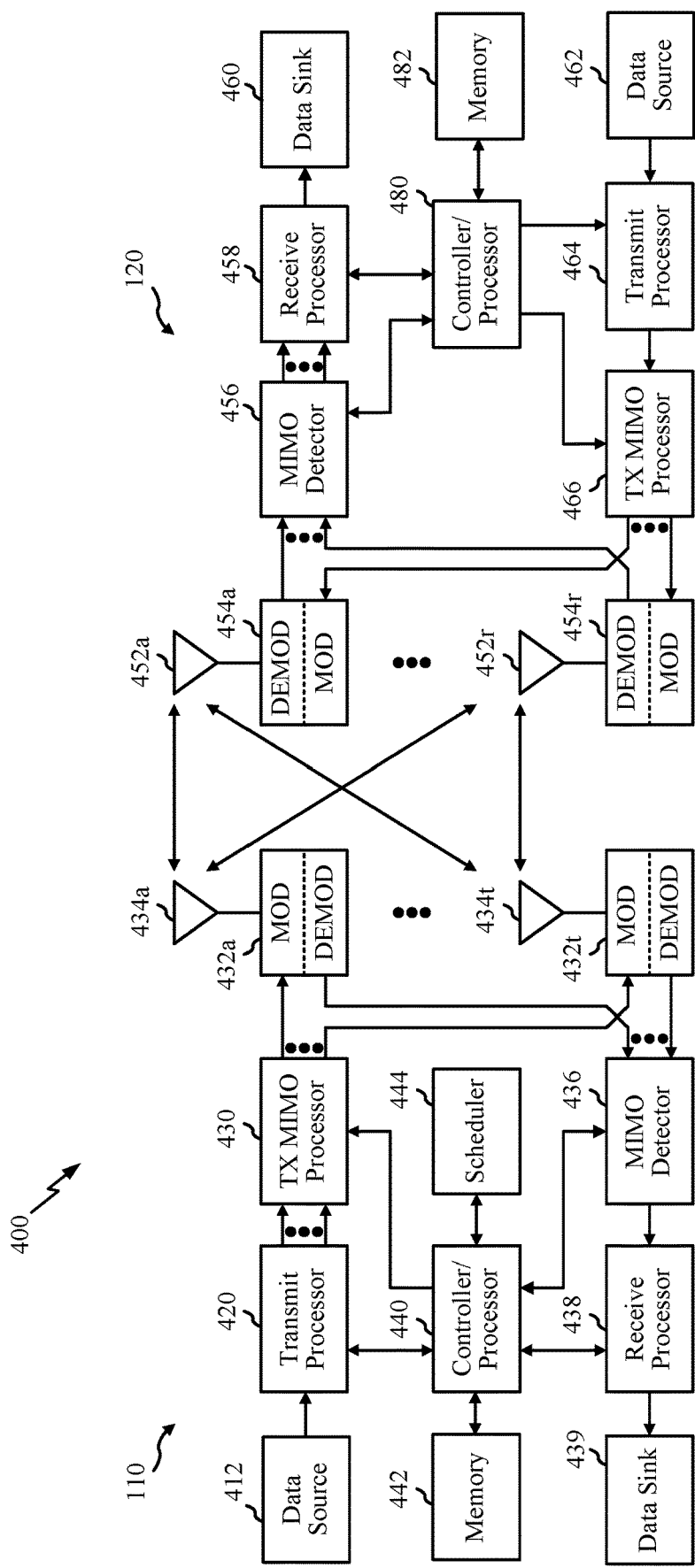
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. The BS may include a TRP and may be referred to as a Master eNB (MeNB) (e.g., Master BS, primary BS). According to aspects, the Master BS may operate at lower frequencies, for example, below 6 GHz and a Secondary BS may operate at higher frequencies, for example, mmWave frequencies above 6 GHz. The Master BS and the Secondary BS may be geographically co-located.

One or more components of the BS 110 and UE 120 may be used to practice aspects of the present disclosure. For example, antennas 452, Tx/Rx 454, processors 466, 458, 464, and/or controller/processor 480 of the UE 120 and/or antennas 434, processors 420, 430, 438, and/or controller/processor 440 of the BS 110 may be used to perform the operations described herein and illustrated with reference to FIGS. 7-13.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of the functional blocks illustrated in FIG. 9, and/or other processes for the techniques described herein. The memories 442 and 482 may store data and program codes for the BS 110 and the UE 120, respectively. A scheduler 444 may schedule UEs for data transmission on the downlink and/or uplink.

Figure 5:
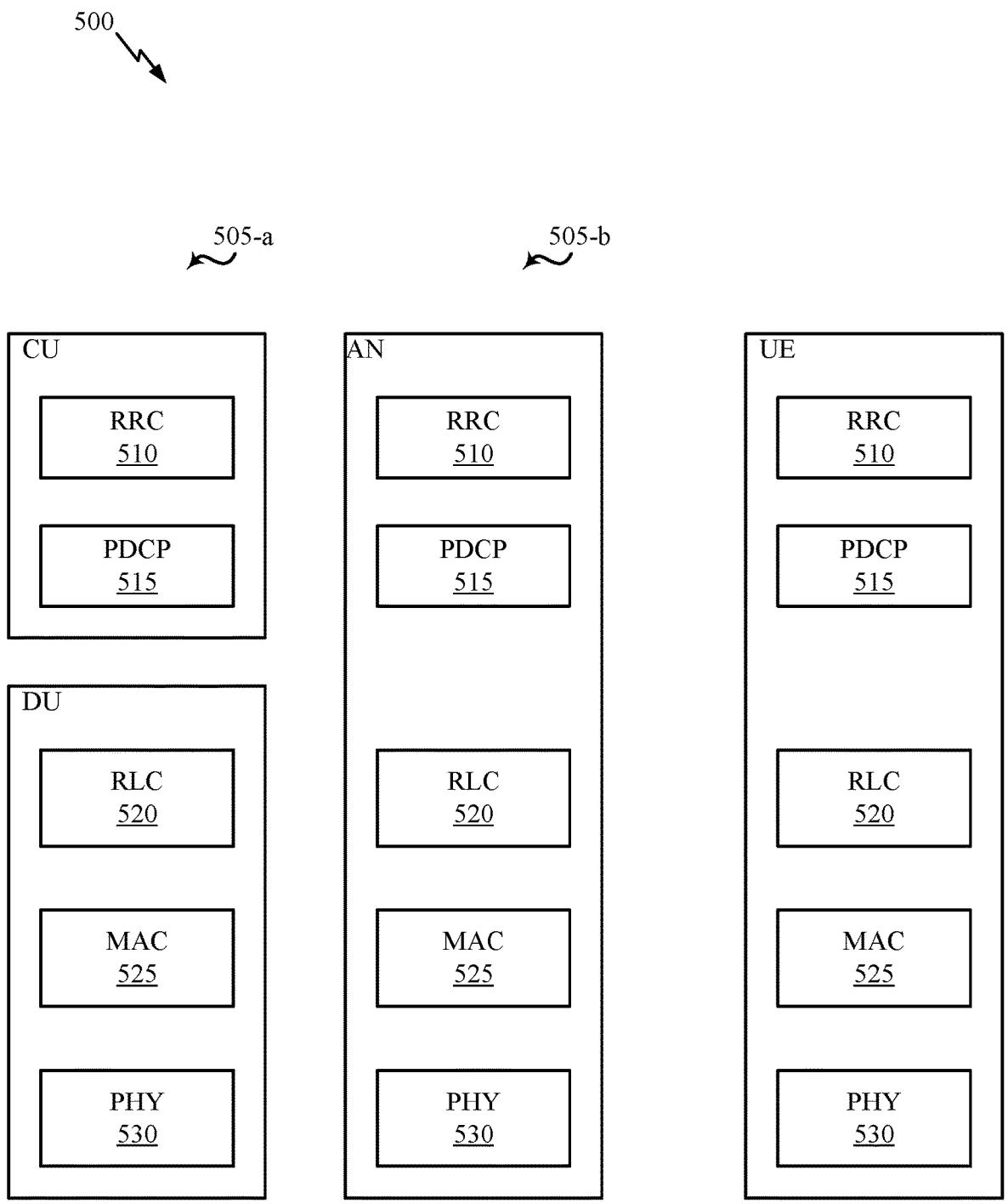
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system. Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6A:
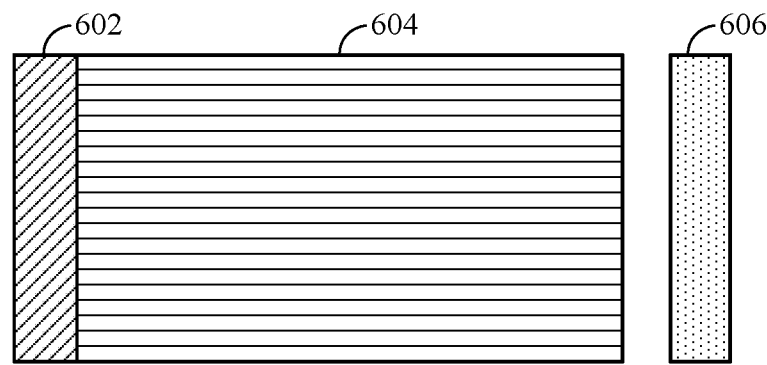
FIG. 6a illustrates an example of a DL-centric subframe, in accordance with certain aspects of the present disclosure.

FIG. 6a is a diagram 6a showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6a. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6a, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 6B:
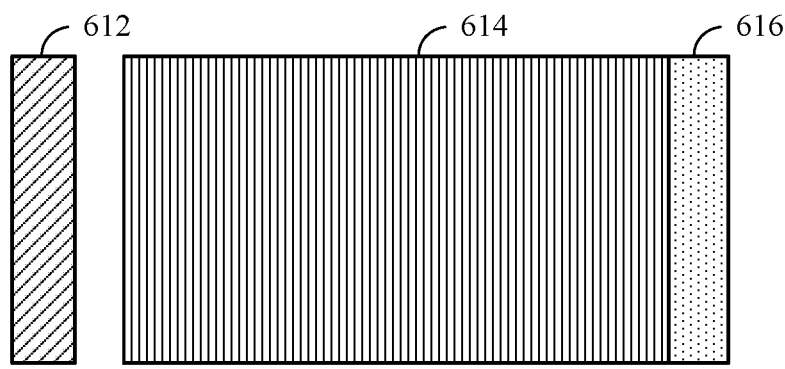
FIG. 6b illustrates an example of an UL-centric subframe, in accordance with certain aspects of the present disclosure.

FIG. 6b is a diagram 6b showing an example of an UL-centric subframe. The UL-centric subframe may include a control portion 612. The control portion 612 may exist in the initial or beginning portion of the UL-centric subframe. The control portion 612 in FIG. 6b may be similar to the control portion described above with reference to FIG. 6a. The UL-centric subframe may also include an UL data portion 614. The UL data portion 614 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 612 may be a physical UL control channel (PUCCH).

As illustrated in FIG. 6b, the end of the control portion 612 may be separated in time from the beginning of the UL data portion 614. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 616. The common UL portion 616 in FIG. 6b may be similar to the common UL portion 616 described above with reference to FIG. 6b. The common UL portion 616 may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Techniques for Managing Interferece Across Operators

In some implementations, a system may utilize time division duplexing (TDD). For TDD, the downlink and uplink share the same frequency spectrum or channel, and downlink and uplink transmissions are sent on the same frequency spectrum. The downlink channel response may thus be correlated with the uplink channel response. Reciprocity may allow a downlink channel to be estimated based on transmissions sent via the uplink. These uplink transmissions may be reference signals or uplink control channels (which may be used as reference symbols after demodulation). The uplink transmissions may allow for estimation of a space-selective channel via multiple antennas.

In operation of a fixed TDD configuration, the actual downlink and uplink traffic load ratio may not be aligned with the ratio of downlink and uplink subframes in the fixed configuration. For example, there may be a system wide misalignment of the downlink and uplink traffic load and fixed downlink and uplink scheduling configuration, or the misalignment may be localized (e.g., some cells may experience a different downlink and uplink load ratio than other cells within the system). If the downlink load is very high the downlink throughput may be perceived as low, even if the uplink resources are under-utilized.

Converting uplink TDD slots (e.g., subframes) to downlink TDD slots (or vice versa) in some cells, such as to more closely align the downlink and uplink scheduling with the corresponding local traffic load for a particular cell may solve this problem, but has traditionally not been practicable due to the converting of such TDD slots in some cells introducing mixed interference scenarios resulting in jamming and otherwise unacceptable interference. For example, in an uplink-to-downlink interference scenario two cell-edge UEs with different serving cells may be arbitrarily close to each other, whereby base station jamming (i.e., jamming of the base station transmission by the nearby UE's transmission) results from the downlink/uplink mismatch at the two UEs. Likewise, in a downlink-to-uplink interference scenario the receive power from an adjacent base station transmission may be much stronger than the desired uplink signals from UEs, resulting in receive de-sense at the base station receiver. Such mixed interference is particularly serious where the interference is between co-channel or adjacent-channel deployments of different operators, where there is limited or no ability for dynamic coordination.

Certain mixed interference management techniques provide for managing communications, such as to dynamically switch downlink and/or uplink TDD subframes or slots, based on mixed interference information. For example, logic of a base station (BS) analyzes information regarding mixed interference to determine if a switch in downlink and/or uplink scheduling is to be implemented, for example, to accommodate additional traffic in the downlink or uplink, to increase downlink or uplink throughput, to meet quality of service (QoS) metrics, to efficiently utilize the spectrum, priority, data class, device class, service class, etc.

The information regarding mixed interference may include mixed interference information reported by one or more UEs served by the base stations and/or mixed interference information reported by one or more other BSs (e.g., other BSs in the system, neighboring BSs, BSs capable of providing/experiencing undesired levels of interference with respect to the BS, etc.). The mixed interference information reported by the one or more other BSs may include mixed interference information regarding one or more UEs served by respective ones of the other BSs (e.g., mixed interference information reported by a UE to one of the other BSs serving that UE). Accordingly, an BS may analyze the impact of downlink and uplink scheduling changes prior to their being implemented and, based on such analysis, implement dynamic switching of downlink and/or uplink slots without introducing unacceptable mixed interference.

Base stations and/or UEs operating within the communication system may perform mixed interference measurements to collect data relevant for the mixed information reporting. For example, base station-to-base station mixed interference may be measured by each base station from other base stations. Similarly, UE-to-UE mixed interference may be measured by each UE from other UEs. For example, a mixed interference measurement protocol may be implemented within the communication frame structure whereby particular subframes (e.g., mixed interference measurement subframes) are utilized for transmission of reference signals for use in mixed interference measurements.

Mixed interference measurement may be performed at various times in accordance with aspects of the present disclosure. For example, mixed interference measurements may be made by base stations and/or UEs operating within a communication system periodically, such as in accordance with the timing of a mixed interference measurement protocol, based upon a temporal schedule (e.g., GPS timing signal, communication system clock, etc.), and/or the like. A mixed interference measurement may be made every iteration of a particular number of subframes (e.g., every X downlink and/or Y uplink subframes, wherein X and Y may be a number of subframes ranging from 2-50, for example, and wherein X and Y may or may not be the same). Additionally or alternatively, a mixed interference measurement may be made upon the occurrence of one or more events. In accordance with an exemplary implementation, one or more iterations of mixed interference measurements may be triggered by significant change events occurring within the communication system, such as one or more UEs moving within a cell (e.g., a distance sufficient to potentially alter interference with UEs in other cells, movement resulting in the UE being disposed more near or farther from a cell edge potentially altering interference with UEs in other cells, a switch in downlink and/or uplink scheduling having been implemented, etc.). A mixed interference measurement may additionally or alternatively be made randomly or pseudo-randomly, such as during periods of reduced communication traffic or other periods in which mixed interference measurement may be accommodated without undesirably impacting communication system operation.

Reporting of the mixed interference information may occur through over-the-air signaling and/or through backhaul connections, wherein the mixed interference information reported may be directly provided by the measured interference power level or may be information derived therefrom.

A UE may report mixed interference measurement information to its serving base station, wherein the mixed interference information comprises information provided by or otherwise derived from the monitoring of other UEs (e.g., UE-to-UE interference). Similarly, base stations may exchange mixed interference measurement information, wherein the mixed interference information comprises information provided by or otherwise derived from the monitoring of other base stations (e.g., base station-to-base station interference). Moreover, the mixed interference information exchanged by the base stations may include information provided by or otherwise derived from the UEs served by that base station monitoring of other UEs (e.g., UE-to-UE interference). The mixed interference information as reported by any such network element (e.g., BS or UE) provides a mixed interference profile for that network element as may be used in performing mixed interference management as discussed herein.

The measurements made by the UEs and/or base stations, such as may comprise signal strength information and signal source identification (e.g., transmitting station identifier, such as base station identification information or UE identification information), perhaps accompanied by other relevant or otherwise useful information (e.g., location at which the measurement was made, time at which the measurement was made, etc.), may be provided in the mixed interference information reports. Additionally or alternatively, information derived from the measurements made by the UEs and/or base stations may be provided in the mixed interference information reports. For example, such derived information may comprise whether or not the signal received from an interfering station exceeds a threshold (e.g., a mixed interference tolerance threshold), information indicating that the measured interference is unacceptable to the reporting receiver, information regarding an amount of signal power back-off needed for the interference to be acceptable to the reporting receiver, location and/or direction information (e.g., relative location of a UE computed from base station receiving antenna direction, received signal strength, timing offset, etc.), and/or the like.

Information regarding the mixed interference profiles of other network elements in the communication system may be utilized by a base station to construct a jamming graph. An exemplary jamming graph provided in accordance with the concepts herein contains information that may be used to evaluate the impact of a scheduling decision that might result in a mixed interference scenario (i.e., where some cells operate in uplink and other cells operate in downlink simultaneously). Accordingly, based on the mixed interference measurement information reported, a base station may generate a jamming graph that summarizes the mixed interference profile relevant to the operations of that base station. The downlink-to-uplink and uplink-to-downlink mixed interference may be summarized in the form of one or more jamming graphs (e.g., base station-to-base station jamming graphs and/or UE-to-UE jamming graphs) provided according to an aspect of the present disclosure.

In an exemplary base station-to-base station jamming graph, such as may be utilized with respect to downlink-to-uplink mixed interference management decisions, one vertex is provided for every base station or every relevant base station (e.g., base stations disposed in the communication system such that they are likely or capable of introducing unacceptable or undesirable interference with respect to the base station generating the jamming graph, or for which the jamming graph is generated). For example, one base station (e.g., $BS_i$) may be connected to another base station (e.g., $BS_j$) in the jamming graph where the signal transmitted from that base station results in unacceptable or undesirable interference with respect to the other base station. In an exemplary implementation where a mixed interference tolerance threshold (e.g., a tolerable IoT threshold (BS_TOLERABLE_IOT)) is used, $BS_i$ is connected to $BS_j$ if the maximum (Max_IoT) measured for $BS_i$ at $BS_j$ is greater than the mixed interference tolerance threshold (e.g., Max_IoT at $BS_j$ for $BS_i$>BS_TOLERABLE_IOT of $BS_j$). Such connections represent instances of downlink-to-uplink mixed interference sufficient to undesirably or unacceptably interfere with communications where asynchronous downlink and uplink scheduling is implemented as between the connected base stations. These connections (also referred to as edges herein) between base stations may be represented in a base station-to-base station jamming graph as a line or link between the base stations. The connections or edges represented in the base station-to-base station jamming graph may have a label associated therewith, wherein the label provides information regarding the connection (e.g., the measured mixed interference power level as measured by the receiving base station, a back-off power level for avoiding the mixed interference, etc.). For example, the labels of edges provided in a base station-to-base station jamming graph implemented according to some aspects of the disclosure comprise the transmit power (e.g., TX-power/EIRP) back-off needed at BS, to ensure that the IoT at $BS_j$ due to $BS_i$ becomes equal to (or less than) the BS_TOLERABLE_IOT of $BS_j$.

In an exemplary UE-to-UE jamming graph, such as may be utilized with respect to uplink-to-downlink mixed interference management decisions, one vertex is provided for every UE or every relevant UE (e.g., UEs disposed in the communication system such that they are likely or capable of introducing unacceptable or undesirable interference with respect to the UEs served by the base station generating the jamming graph, or for which the jamming graph is generated). For example, one UE (e.g., $UE_i$) may be connected to another UE (e.g., $UE_j$) in the jamming graph where the signal transmitted from that UE results in unacceptable or undesirable interference with respect to the other UE. In an exemplary implementation where a mixed interference tolerance threshold (e.g., a tolerable IoT threshold (UE_TOLERABLE_IOT)) is used, $UE_i$ is connected to $UE_j$ if the maximum (Max_IoT) measured for $UE_i$ at $UE_j$ is greater than the mixed interference tolerance threshold (e.g., Max_IoT at $UE_j$ for $UE_i$>UE_TOLERABLE_IOT of $UE_j$). Such connections represent instances of uplink-to-downlink mixed interference sufficient to undesirably or unacceptably interfere with communications where asynchronous uplink and downlink scheduling is implemented as between the connected UEs. Similar to the base station-to-base station jamming graphs discussed above, these connections (also referred to as edges herein) between UEs may be represented in a UE-to-UE jamming graph as a line or link between the UEs. The connections or edges represented in the UE-to-UE jamming graph may also have a label associated therewith, wherein the label provides information regarding the connection (e.g., the measured mixed interference power level as measured by the receiving UE, a back-off power level for avoiding the mixed interference, etc.). For example, the labels of edges provided in a UE-to-UE jamming graph implemented according to some aspects of the disclosure comprise the transmit power (e.g., TX-power/EIRP) back-off needed at $UE_i$ to ensure that the IoT at $UE_j$ due to $UE_i$ becomes equal to (or less than) the UE_TOLERABLE_IOT of $UE_j$.

Figure 7A:
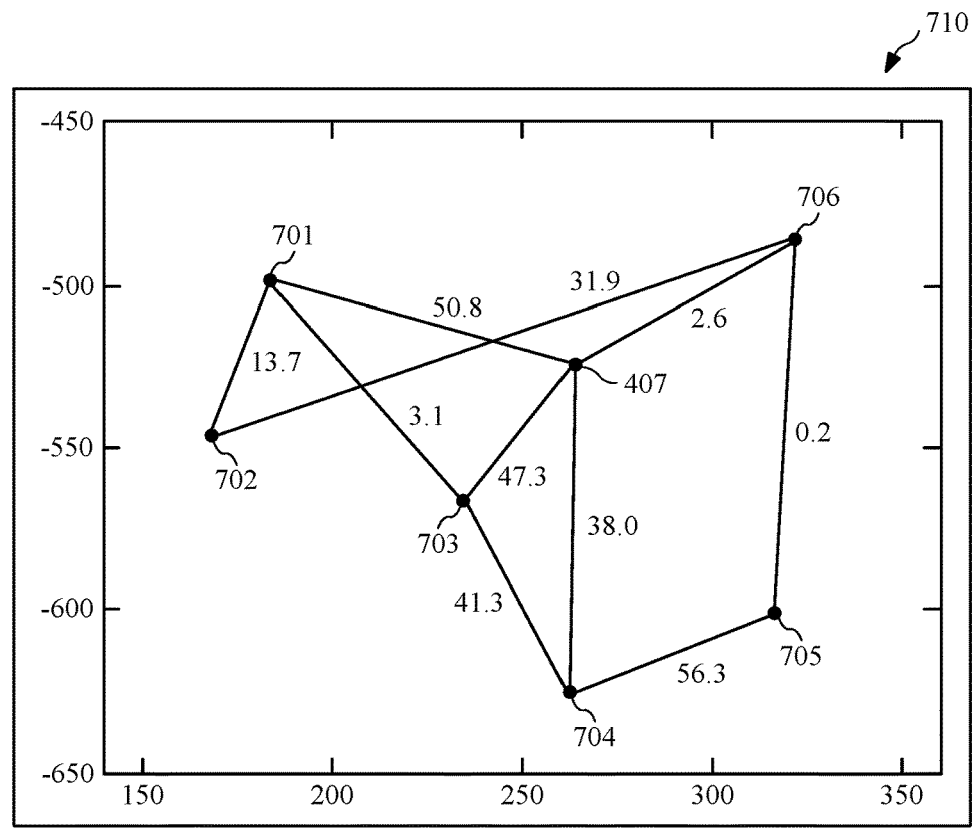
FIGS. 7A and 7B illustrate example jamming graphs, in accordance with certain aspects of the present disclosure.
Figure 7B:
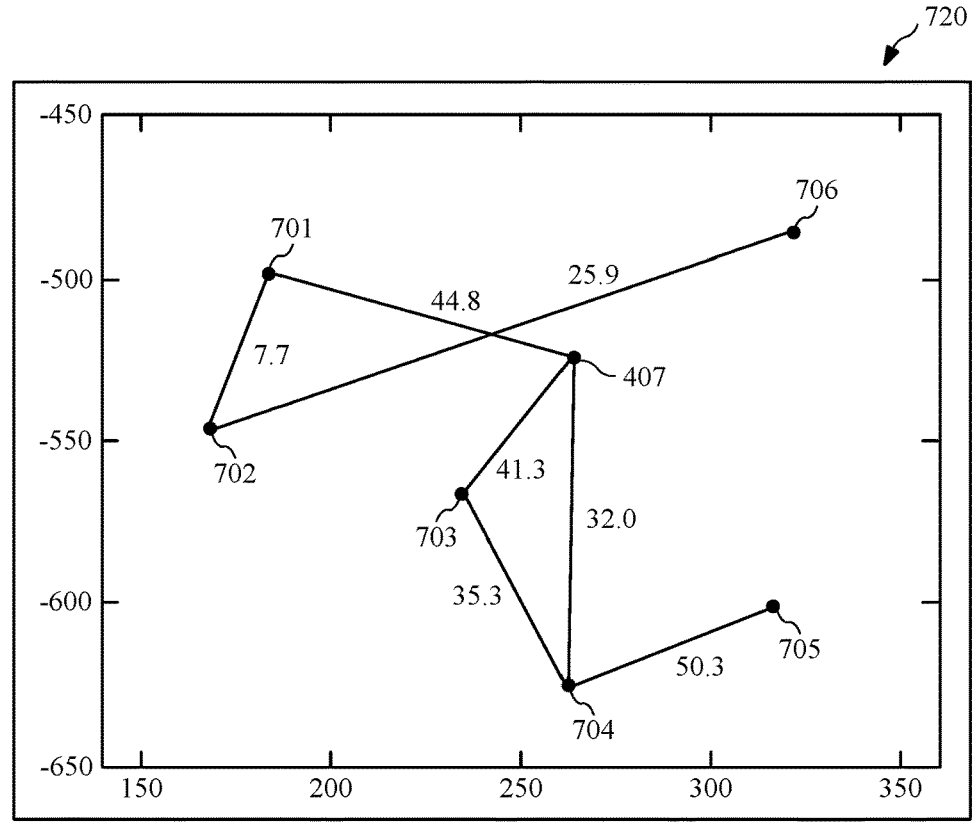

Example jamming graphs, as may be provided in operation of exemplary implementations, are shown in FIGS. 7A and 7B. The example of FIG. 7A shows a global view of a base station-to-base station jamming graph as base station-to-base station jamming graph 710. In the illustrated example of base station-to-base station jamming graph 710, vertices 701-707 represent the base stations of the communication system. The aforementioned edges, representing instances of uplink-to-downlink mixed interference sufficient to undesirably or unacceptably interfere with communications, are shown by the lines connecting particular ones of the vertices. The aforementioned labels, representing a back-off power level in dB for avoiding the mixed interference, are shown by the numbers associated with each of the illustrated edges. For example, the labels of the illustrated example show the power back-off needed to meet a 3 dB tolerable limit of interference over thermal noise.

In some implementations, each base station may only learn about and use the information about edges directly connected to it. Accordingly, a base station-to-base station jamming graph generated by such a base station (or for which the jamming graph was generated) might only include the edges directly connected to that base station. However, in another implementations, a base station may also learn about edges between other base stations, possibly restricted to neighbors only. Accordingly, a base station-to-base station jamming graph generated by such a base station may include edges connecting base station pairs that do not include the base station that generated the jamming graph (or for which the jamming graph was generated). As an example, this may enable the base station to predict whether the neighbor base station will be able to convert direction, and may incorporate this information into its own analysis of the interference environment.

The example of FIG. 7B shows base station-to-base station jamming graph 720 regenerated from the mixed interference information utilized in generating base station-to-base station jamming graph 710 of FIG. 7A with a 6 dB transmission power back-off. As can be seen in the example illustrated in FIG. 7B, this 6 dB power back-off results in some of the edges (e.g., the edges between vertices 701 and 703, between vertices 705 and 706, and between vertices 706 and 707) being eliminated, thereby indicating that the power back-off is sufficient to avoid undesired or unacceptable uplink-to-downlink mixed interference between the base stations represented by those vertices. It should be appreciated that labels shown in base station-to-base station jamming graph 720 of FIG. 7B are likewise updated to show the further power back-off needed to meet a 3 dB tolerable limit of interference over thermal noise with respect to the remaining edges.

As may be appreciated from the foregoing, jamming graphs provided according to the concepts herein may be utilized to determine if a switch in downlink and/or uplink scheduling may be implemented, such as to accommodate additional traffic in the downlink or uplink, to increase downlink or uplink throughput, to meet quality of service (QoS) metrics, to efficiently utilize the spectrum, etc. As an example, a base station may analyze the impact of downlink and uplink scheduling changes prior to their being implemented and, based on such analysis, implement dynamic switching of downlink and/or uplink slots without introducing unacceptable mixed interference. Such analysis and implementation of dynamic switching of downlink and/or uplink slots may include analyzing and/or implementing power back-off, such as through the regeneration of jamming graphs with a power back-off. Persons skilled in the art will appreciate that the representations provided in FIGS. 7A and 7B are merely illustrative examples of jamming graphs and that any other suitable representations capturing information regarding mixed interference profiles may be used.

In a multi operator scenario (e.g., multiple RANs operated by different operators), chunks of a frequency spectrum are allocated to the different operators. For example, if two different operators are operating in a particular service area, a first bandwidth region of the spectrum is allocated to a first operator and a second bandwidth region of the spectrum is allocated to a second operator. Generally, every operator uses fixed TDD UL/DL subframe configurations within their own allocated bandwidth regions that are mutually agreed between the operators to minimize or completely avoid mixed interference across network elements (e.g., base stations or UEs) of the different operators. In certain aspects, if the two operators are assigned adjacent bandwidth regions of the spectrum, network elements of both the operators are configured to transmit and/or receive in a synchronous fashion. For example, the two operators agree on using a same transmission direction (UL or DL direction) for one or more subframes of both the operators in a particular time interval to avoid mixed interference between network elements of the two operators.

Ideally each operator may like to decide whether to use a particular time interval (e.g. subframe) for UL or DL transmission dynamically based on current traffic needs of the operator, for example, to maximize throughput. However, different operators may have different traffic needs in a particular time interval. Thus, adjacent operators (e.g., operators assigned adjacent bandwidth regions of a frequency spectrum) operating asynchronously (e.g., employing dynamic TDD configuration) may choose to transmit in opposite directions within the same time interval, causing mixed interference across network elements of the two operators.

One goal of $5^{th}$ Generation (5G) standards is to provide for dynamic scheduling of UL or DL transmissions for one or more subframes in a network depending on current traffic needs of the network. This dynamic configuration of subframes is often referred to as Dynamic TDD configuration or simply Dynamic TDD. Dynamic TDD has been made possible within a particular operator's assigned bandwidth region by coordination among network elements of the particular operator. For example, as noted above, mixed interference profiles may be exchanged between network elements of the operator. One or more network elements (e.g., base stations) of the operator may dynamically select a transmission direction (e.g., UL or DL) to be used in a particular transmission interval based on the traffic needs of the network element and/or based on the mixed interference profiles received from other neighboring network elements.

However, operators generally are not willing to share data across operators' networks, and thus, coordination between network elements of different operators for the purposes of mixed interference mitigation is not generally practical. Thus, to avoid mixed interference between network elements across networks of different operators (e.g., operators that are assigned adjacent bandwidth regions of a spectrum), the operators, as noted above, generally agree upon fixed TDD subframe configurations.

Figure 8:
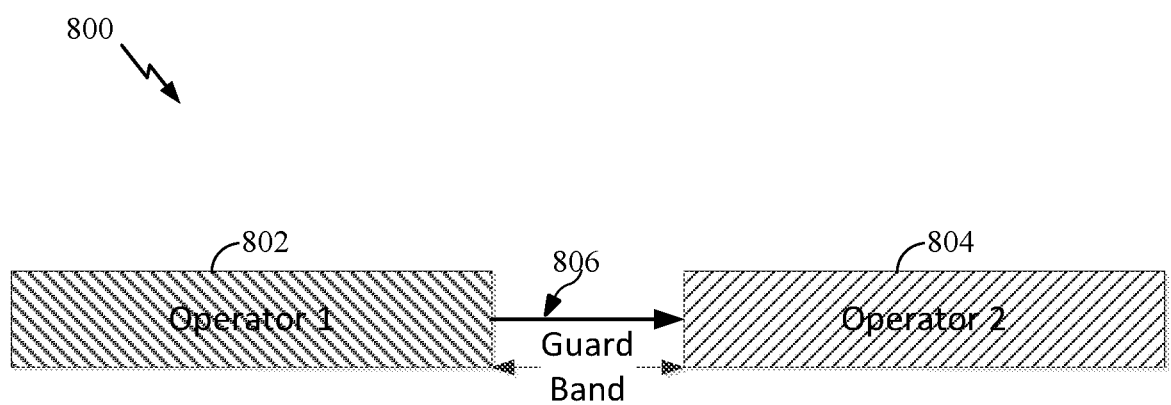
FIG. 8 illustrates example deployment of bandwidth regions of two adjacent operators, in accordance with certain aspects of the present disclosure.

One solution to enable adjacent operators (e.g., assigned adjacent bandwidth regions of a spectrum) to employ asynchronous TDD operation (e.g., dynamic TDD not synchronous with adjacent operator's network), is to have a large guard band separating the bandwidth regions of the two adjacent operators so that transmissions within bandwidth regions of the two operators do not interfere with each other. This is illustrated in FIG. 8 which shows bandwidth region 802 assigned to operator 1 and another adjacent bandwidth region 804 assigned to operator 2. As shown, bandwidth regions 802 and 804 are separated by a guard band 806. In an aspect, the guard band is selected to be large enough to enable one or both operators to operate asynchronously and select transmission directions based on current traffic needs of the operator.

However a large guardband leads to wastage of spectrum which generally is a valuable resource. Thus, there is a need for techniques that may enable different operators to employ asynchronous TDD operation (e.g., dynamic TDD) with minimal mixed interference between network elements of the operators and without wasting too much spectrum allocated for guard bands.

In certain aspects of the present disclosure, a technique to accomplish the above goal may include dividing bandwidth regions assigned to networks of each of one or more operators (e.g., operators having adjacent assigned bandwidth regions of a spectrum) into regions of asynchronous TDD operation (e.g., dynamic TDD configuration) and synchronous TDD operation (e.g., static UL/DL configuration), with synchronous regions of the networks assigned at edges of the bandwidth regions closer to each other.

For example, the synchronous region of a first operator is allocated towards the edge of the first operator's allocated spectrum and faces the synchronous region of a second operator. The synchronous region of the second operator is also allocated towards the edge of its own spectrum facing the first operator's spectrum. Thus, the asynchronous and synchronous regions for each operator with adjacent allocated bandwidth regions of a spectrum may be allocated such that the synchronous regions of the two operators are allocated towards the edges of each of the operators' spectrums closer to each other and the asynchronous regions of the operators are allocated away from the edges of their own bandwidth region facing the other operator's bandwidth region. Thus, the asynchronous regions of two adjacent operators have a good buffer between them and the dynamic TDD operation in these asynchronous regions may cause little or no mixed interference to each other. The synchronous regions generally employ fixed TDD subframe configurations mutually agreed between the operators for minimal mixed interference between network elements of the two operators operating in the synchronous regions.

Thus, instead of leaving a large guard band unused, at least a portion of the guard band may be used for regions of synchronous TDD operation for the adjacent operators, with subframe timing and DL/UL configurations synchronized across the synchronous regions of the two operators. This way spectrum wastage for employing the guard bands may be reduced or eliminated at the same time providing the necessary buffer between the asynchronous regions of the operators for mitigating mixed interference across operators. Thus, in certain aspects, UE RB allocation may be dynamically adjusted to make use of the RBs in the guard band for synchronous TDD operation (UL or DL) between two different operators. Further, a UE may be allocated RBs from the guard band between adjacent bandwidth regions of two operators based on a directionality aspect of a jamming graph with respect to the UE (e.g., the UE's location in the network). As long as the transmission directions of subframes used within the guard band are synchronized across the two adjacent operators, the guardband may be allocated for UL or DL transmission.

Figure 9:
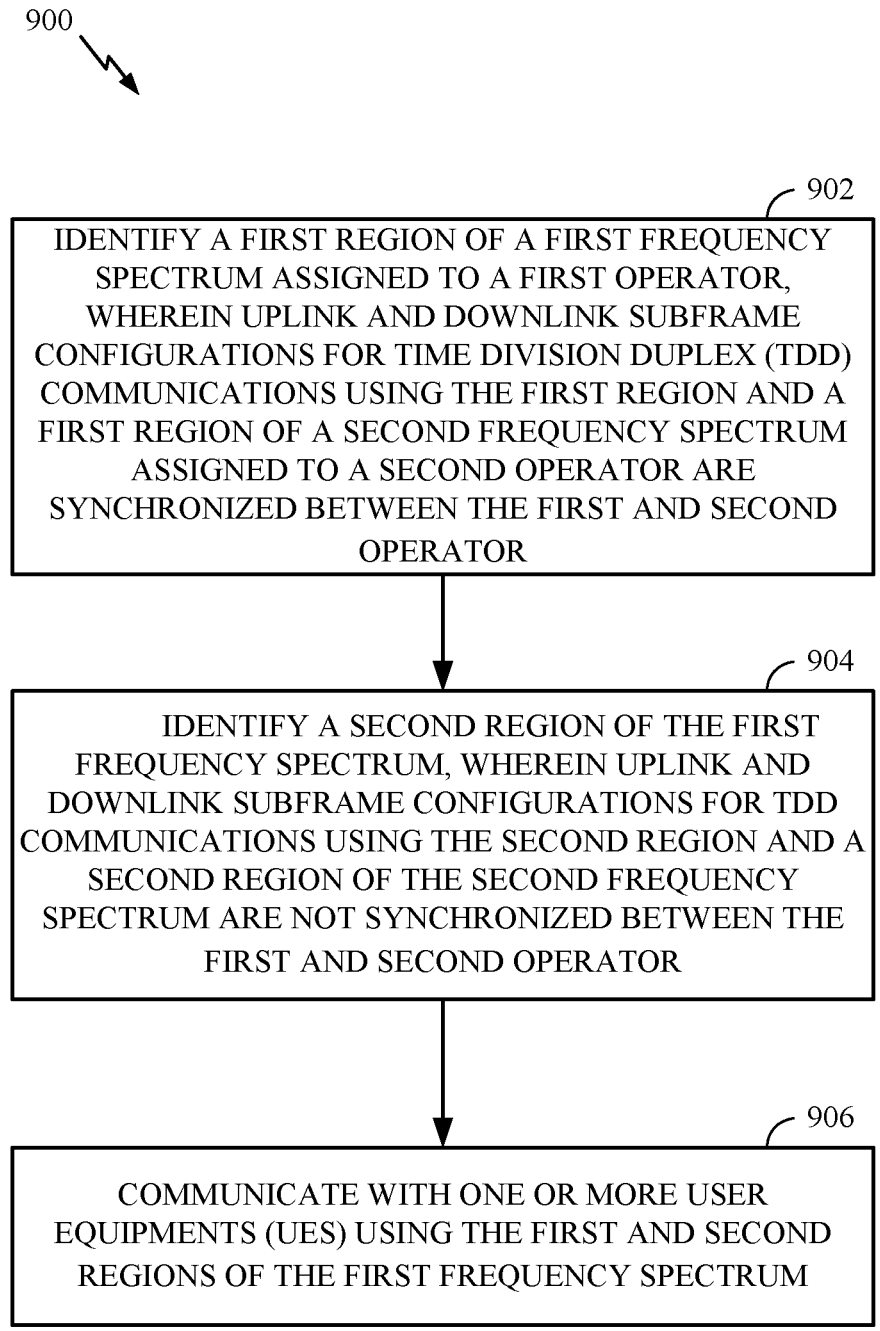
FIG. 9 illustrates example operations that maybe performed by a base station, for implementing dynamic TDD across operators, in accordance with certain aspects of the present disclosure.

FIG. 9 illustrates example operations 900 that maybe performed by a base station, for implementing dynamic TDD across operators, in accordance with certain aspects of the present disclosure. Operations 900 begin, at 902 by identifying a first region of a first frequency spectrum (or bandwidth region) assigned to a first operator, wherein uplink and downlink subframe configurations for TDD communications using the first region and a first region of a second frequency spectrum (or bandwidth region) assigned to a second operator are synchronized between the first and second operator. At 904, the base station identifies a second region of the first frequency spectrum, wherein uplink and downlink subframe configurations for TDD communications using the second region and a second region of the second frequency spectrum are not synchronized between the first and second operator. At 906, the base station communicates with one or more UEs using the first and second regions of the first frequency spectrum.

Figure 10:
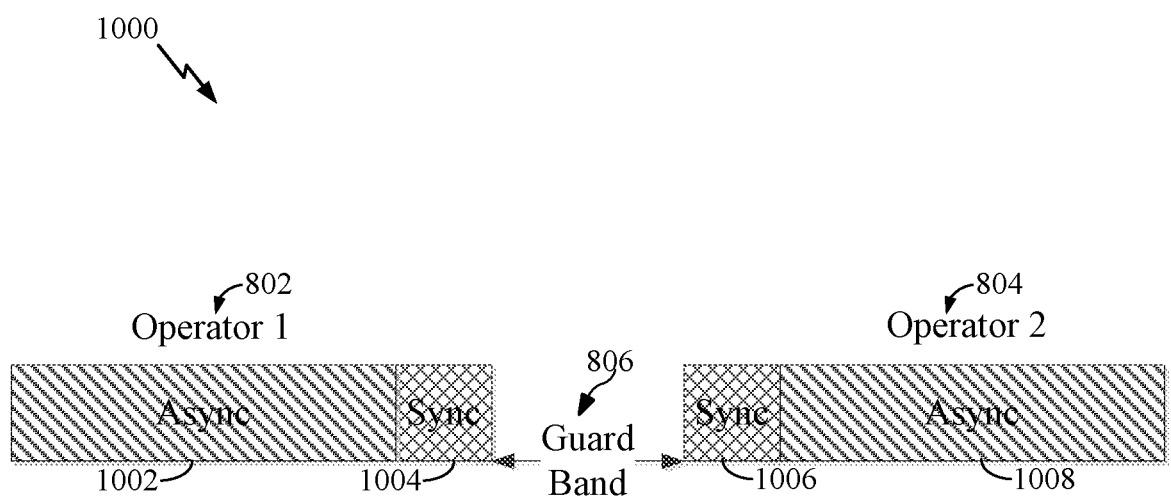
FIG. 10 illustrates an example technique for managing mixed interference between networks of different operators, in accordance with certain aspects of the present disclosure.

FIG. 10 illustrates an example technique for managing mixed interference between networks of different operators, in accordance with certain aspects of the present disclosure. As shown in FIG. 10, bandwidth region 802 is assigned to operator 1 and bandwidth region 804 is assigned to operator 2. Each of the bandwidth regions 802 and 804 are divided into regions of asynchronous TDD operation and synchronous TDD operation. For example, as shown in FIG. 10, bandwidth region 802 of operator 1 includes asynchronous region 1002 (e.g., employing asynchronous dynamic TDD) and a synchronous region 1004 (employing fixed TDD operation). Similarly, bandwidth region 804 of operator 2 includes synchronous region 1006 and asynchronous region 1008. As shown, the synchronous regions 1004 and 1006 are assigned at the edges of each of the bandwidth regions 802 and 804 respectively adjacent to each other. This way the synchronous regions provide a buffer region between the asynchronous regions of the two operators so that the mixed interference between the two asynchronous regions is minimal or non-existent.

In certain aspects, since the synchronous regions 1004 and 1006 provide the buffer between the asynchronous regions 1002 and 1008, the guard band 806 may be reduced in size or completely eliminated based on the sizes chosen for the synchronous regions 1004 and 1006. In an aspect, smaller synchronous regions may require larger guard bands and larger synchronous regions may require smaller or no guard bands between bandwidth regions of the adjacent operators. Thus, in an aspect, the placement of synchronous regions of each of the operators at edges of their assigned bandwidth regions facing each other minimizes or in some cases eliminates the need for a guard band between the operators' assigned bandwidths. In certain aspects, the amounts of each of the operator's spectrum allocated for asynchronous and synchronous regions may be decided based on one or more criteria including interference profiles, guardband between the two operators' spectrums, any other suitable criteria, and/or any combination thereof.

In certain aspects, moderate inter-operator coordination may be implemented to employ opportunistic guard bands between bandwidth regions of the operators. For example, a size of the guard band between bandwidth regions of two different operators may be chosen based on coordination between the two operators. For instance, the size of the guard band may be selected based on the two operators exchanging information regarding sizes of their synchronous regions adjacent to each other.

In an aspect, since asynchronous operation provides flexibility to the operator to optimize capacity by choosing DL/UL configuration depending on traffic needs, an attempt is made to allocate as much of the bandwidth regions 802 and 804 of each of the operators as possible for asynchronous operation. This approach is most beneficial to the operator. In an aspect, an operator may choose a size of its synchronous region to be as small as possible in order to minimize the mixed interference with an adjacent bandwidth region of a different operator to acceptable levels (e.g., below a threshold) and may assign rest of the bandwidth for asynchronous operation.

In certain aspects, some level of inter-operator interference coordination may implement dynamic TDD for at least some portion of the synchronous regions of the operators. For example, there may be some limited information sharing between two adjacent operators. This limited coordination between adjacent operators may be used to implement dynamic TDD in the synchronous regions of the operators in a limited fashion. For example, some resources (e.g., subframes or RBs) of a synchronous region may be scheduled dynamically (e.g., based on current traffic needs) based on the limited exchanged information between the operators. This limited exchanged information may include information regarding jamming graphs (e.g., jamming graphs 710 and 720 of FIGS. 7A and 7B). Having information regarding jamming graphs from an adjacent second operator, a first operator may use the synchronous region in a more aggressive manner by deciding to reverse the pre-determined fixed direction (e.g. UL to DL or vice versa) configured for a subframe subject to one or more constraints imposed by the jamming graphs shared by the second operator. Thus, this type of inter-operator coordination may help an operator to override the fixed configuration of one or more subframes in its synchronous region.

In certain aspects, in order to implement such inter-operator coordination, the entire system (e.g., including bandwidth regions of both the operators) may be treated essentially like multi-channel deployment of the same operator. Time synchronous, mutually compatible subframe configurations may be employed across multiple deployments. Network elements of an operator may be allowed to transmit (or at least listen for) reference signals in the other operator's channels. This transmission may be performed at a low duty cycle. For instance, this may provide for mixed channel state information (CSI) sharing. In certain aspects, backhaul connectivity across cells of multiple operators may be implemented for sharing of information regarding mixed interference (e.g., jamming graph information such as provided by jamming graphs 710 and 720 of FIGS. 7A and 7B). Additionally or alternatively, dynamic over-the-air (OTA) signaling may be implemented for sharing of such information across operators.

In certain aspects, the asynchronous and synchronous regions of each operator's assigned bandwidth region may be mapped to separate carriers (e.g., component carriers) or separate sets of carriers. Carriers (or sub-carriers) within the synchronous region of an operator do not cause mixed interference to each other as the UL/DL configurations within the synchronous region remains fixed. However, network elements assigned for operation in the asynchronous and synchronous regions may cause mixed interference to each other as UL/DL configurations are chosen dynamically in the asynchronous region.

To manage this mixed interference between network elements of the asynchronous region and synchronous region, intra-operator interference coordination may be implemented to manage (e.g., mitigate) the mixed interference across the asynchronous and synchronous regions. For example, as discussed above, information regarding interference profiles (e.g., mixed interference information) may be exchanged between network elements of the asynchronous and synchronous regions, and one or more network elements (e.g., base stations) may choose UL/DL configuration for one or more subframes based on the exchanged interference information. In an aspect, the exchanged information may include information regarding jamming graphs (e.g., similar to the jamming graphs shown in FIGS. 7A and 7B).

In certain aspects, the static-TDD carrier (or set of carriers) never reverses subframe direction. It simply yields to its co-deployed dynamic TDD carrier as dictated by the mixed interference management approach discussed above. In other words, scheduling decisions of the static TDD carrier always has lower priority than the co-deployed dynamic TDD carrier.

In certain aspects, intra-operator interference coordination between network elements of a particular operator may not be possible. For example, network elements (e.g., UE, BS etc.) assigned to a first carrier may not exchange information regarding mixed interference profiles with network elements (e.g., UE, BS etc.) assigned to a second adjacent carrier, both first and second carriers being assigned within the bandwidth region of a particular operator. In some cases, the operator may avoid intra-operator interference coordination to simplify operation, for example, when running different kinds of services on each of the first carrier and the second carrier. In certain aspects, the techniques discussed above to mitigate inter-operator interference may be implemented to mitigate intra-operator interference, for example, between network elements assigned to adjacent carriers of the operator. For example, each of the first and second carriers may be divided into portions of asynchronous TDD operation (e.g., dynamic TDD configuration) and synchronous TDD operation (e.g., static UL/DL configuration), with synchronous portions of the carriers assigned at edges of the carriers closer to each other, thus providing a buffer between the asynchronous portions of the two carriers.

Figure 11:
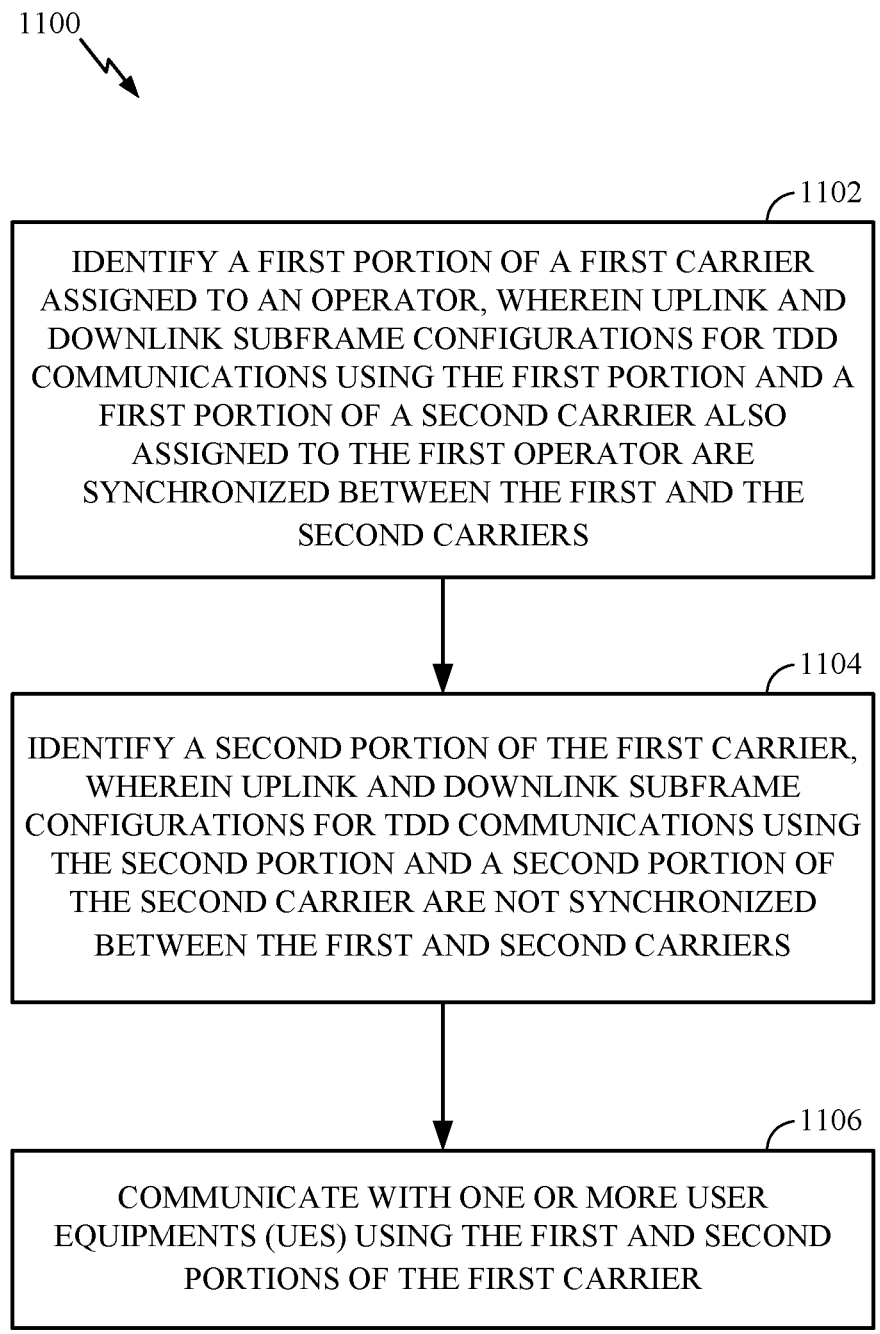
FIG. 11 illustrates example operations that maybe performed by a base station, for implementing dynamic TDD across carriers assigned to a particular operator, in accordance with certain aspects of the present disclosure.

FIG. 11 illustrates example operations 1100 that maybe performed by a base station, for implementing dynamic TDD across carriers assigned to a particular operator, in accordance with certain aspects of the present disclosure. Operations 1100 begin, at 1102, by identifying a first portion of a first carrier assigned to an operator, wherein uplink and downlink subframe configurations for TDD communications using the first portion and a first portion of a second carrier also assigned to the first operator are synchronized between the first and the second carrier. At 1104, the base station identifies a second portion of the first carrier, wherein uplink and downlink subframe configurations for TDD communications using the second portion and a second portion of the second carrier are not synchronized between the first and second carriers. At 1106, the base station communicates with one or more UEs using the first and second portions of the first carrier.

In certain aspects, synchronous region of an operator may be mapped to a set of resource blocks (RBs). As noted above, operators agree on pre-determined fixed UL/DL configurations for the synchronous regions. In an aspect, if the pre-determined fixed configuration for one or more RBs in the set of resources mapped to a synchronous region is in agreement with what is chosen for the one or more RBs by the operator, the one or more RBs are used for communication. On the other hand, if the pre-determined fixed configuration of the RBs does not agree with the operator chosen configuration for the RBs, the RBs are left unused. For example, if the operator decides UL for a subframe while the synchronous region corresponds to DL, then RBs in the synchronous region are left unused. In certain aspects, the final UL/DL configuration is determined as a combination of traffic requirements as well as the fraction of time for which the synchronous region is left unused.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

In some cases, rather than actually communicating a frame, a device may have an interface to communicate a frame for transmission or reception. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The various operations of methods described above may be performed by any suitable means capable of performing the corresponding functions. The means may include various hardware and/or software/firmware component(s) and/or module(s), including, but not limited to a circuit, an application specific integrated circuit (ASIC), or processor. Generally, where there are operations illustrated in Figures, those operations may be performed by any suitable corresponding counterpart means-plus-function components.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or combinations thereof.

Those of skill would further appreciate that the various illustrative logical blocks, modules, circuits, and algorithm steps described in connection with the disclosure herein may be implemented as electronic hardware, software/firmware, or combinations thereof. To clearly illustrate this interchangeability of hardware and software/firmware, various illustrative components, blocks, modules, circuits, and steps have been described above generally in terms of their functionality. Whether such functionality is implemented as hardware or software/firmware depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software/firmware module executed by a processor, or in a combination thereof. A software/firmware module may reside in RAM memory, flash memory, ROM memory, EPROM memory, EEPROM memory, phase change memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software/firmware, or combinations thereof. If implemented in software/firmware, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD/DVD or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software/firmware is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication by a base station, comprising:
identifying a first portion of a first carrier, wherein uplink and downlink subframe configurations for time division duplexing (TDD) communications using the first portion of the first carrier and a first portion of a second carrier are synchronized between the first and the second carriers, wherein the first carrier and the second carrier are adjacent to each other and assigned to the same network operator;
identifying a second portion of the first carrier, wherein uplink and downlink subframe configurations for TDD communications using the second portion of the first carrier and a second portion of the second carrier are not synchronized between the first and second carriers; and
communicating with one or more user equipments (UEs) using the first and second portions of the first carrier.

2. The method of claim 1, further comprising dynamically changing uplink and downlink subframe configurations for TDD communications using the second portion of the first carrier.

3. The method of claim 1, wherein synchronized uplink and downlink subframe configurations for TDD communications using the first portion of the first carrier and the first portion of the second carrier includes one or more fixed uplink and downlink subframe configurations.

4. The method of claim 1, wherein the first portion of the first carrier is adjacent to the first portion of the second carrier.

5. The method of claim 1, further comprising selecting an uplink/downlink subframe configuration for each of one or more subframes for TDD communications using the second portion of the first carrier, based on coordination with at least one network element operating on the second carrier.

6. The method of claim 5, wherein the coordination includes exchanging information relating to mixed interference with the at least one network element operating on the second carrier.

7. An apparatus for wireless communication by a base station, comprising:
means for identifying a first portion of a first carrier, wherein uplink and downlink subframe configurations for time division duplexing (TDD) communications using the first portion of the first carrier and a first portion of a second carrier are synchronized between the first and the second carriers, wherein the first carrier and the second carrier are adjacent to each other and assigned to the same network operator;
means for identifying a second portion of the first carrier, wherein uplink and downlink subframe configurations for TDD communications using the second portion of the first carrier and a second portion of the second carrier are not synchronized between the first and second carriers; and
means for communicating with one or more user equipments (UEs) using the first and second portions of the first carrier.

8. The apparatus of claim 7, further comprising means for dynamically changing uplink and downlink subframe configurations for TDD communications using the second portion of the first carrier.

9. The apparatus of claim 7, wherein synchronized uplink and downlink subframe configurations for TDD communications using the first portion of the first carrier and the first portion of the second carrier includes one or more fixed uplink and downlink subframe configurations.

10. The apparatus of claim 7, wherein the first portion of the first carrier is adjacent to the first portion of the second carrier.

11. The apparatus of claim 7, further comprising means for selecting an uplink/downlink subframe configuration for each of one or more subframes for TDD communications using the second portion of the first carrier, based on coordination with at least one network element operating on the second carrier.

12. The apparatus of claim 11, wherein the coordination includes exchanging information relating to mixed interference with the at least one network element operating on the second carrier.

13. An apparatus for wireless communication by a base station, comprising:
at least one processor configured to:
identify a first portion of a first carrier, wherein uplink and downlink subframe configurations for time division duplexing (TDD) communications using the first portion of the first carrier and a first portion of a second carrier are synchronized between the first and the second carriers, wherein the first carrier and the second carrier are adjacent to each other and assigned to the same network operator;
identify a second portion of the first carrier, wherein uplink and downlink subframe configurations for TDD communications using the second portion of the first carrier and a second portion of the second carrier are not synchronized between the first and second carriers; and
communicate with one or more user equipments (UEs) using the first and second portions of the first carrier; and
a memory coupled to the at least one processor.

14. The apparatus of claim 13, wherein the at least one processor is further configured to dynamically change uplink and downlink subframe configurations for TDD communications using the second portion of the first carrier.

15. The apparatus of claim 13, wherein synchronized uplink and downlink subframe configurations for TDD communications using the first portion of the first carrier and the first portion of the second carrier includes one or more fixed uplink and downlink subframe configurations.

16. The apparatus of claim 13, wherein the first portion of the first carrier is adjacent to the first portion of the second carrier.

17. The apparatus of claim 13, wherein the at least one processor is further configured to select an uplink/downlink subframe configuration for each of one or more subframes for TDD communications using the second portion of the first carrier, based on coordination with at least one network element operating on the second carrier.

18. The apparatus of claim 17, wherein the coordination includes exchanging information relating to mixed interference with the at least one network element operating on the second carrier.

* * * * *